United States Patent
Chandramohan et al.

(10) Patent No.: US 11,822,459 B2
(45) Date of Patent: Nov. 21, 2023

(54) AUTOMATED FUNCTION CATEGORY DETECTION

(71) Applicant: Oracle International Corporation, Redwood Shores, CA (US)

(72) Inventors: Mahinthan Chandramohan, Mansfield (AU); Cristina Cifuentes, Brisbane (AU)

(73) Assignee: Oracle International Corporation, Redwood Shores, CA (US)

( * ) Notice: Subject to any disclaimer, the term of this patent is extended or adjusted under 35 U.S.C. 154(b) by 228 days.

(21) Appl. No.: 17/330,103

(22) Filed: May 25, 2021

(65) Prior Publication Data
US 2022/0382664 A1    Dec. 1, 2022

(51) Int. Cl.
*G06F 11/36* (2006.01)
*G06F 16/28* (2019.01)
*G06N 20/00* (2019.01)

(52) U.S. Cl.
CPC ........ *G06F 11/3616* (2013.01); *G06F 16/285* (2019.01); *G06N 20/00* (2019.01)

(58) Field of Classification Search
CPC .... G06F 11/3616; G06F 16/285; G06N 20/00
USPC .................................................. 717/120–168
See application file for complete search history.

(56) References Cited

U.S. PATENT DOCUMENTS

| | | | | |
|---|---|---|---|---|
| 7,596,778 B2 * | 9/2009 | Kolawa | ............... | G06F 11/3688 714/38.14 |
| 8,635,204 B1 * | 1/2014 | Xie | .......................... | G06F 8/71 707/E17.075 |
| 10,838,699 B2 * | 11/2020 | Dayanandan | ............. | G06F 8/10 |
| 11,036,858 B2 * | 6/2021 | Chistyakov | ......... | G06F 18/2414 |
| 2005/0193269 A1 * | 9/2005 | Haswell | ............... | G06F 11/3684 714/E11.208 |
| 2018/0276562 A1 * | 9/2018 | Woulfe | ................... | G06N 20/00 |
| 2019/0079752 A1 * | 3/2019 | Makkar | ...................... | G06F 8/73 |
| 2021/0271587 A1 * | 9/2021 | Miller | ....................... | G06F 8/43 |

OTHER PUBLICATIONS

Newsome, James, and Dawn Xiaodong Song. "Dynamic taint analysis for automatic detection, analysis, and signatureregeneration of exploits on commodity software." NDSS. vol. 5. 2005. pp. 1-41 (Year: 2005).*

Cao, Yinzhi, et al. "EdgeMiner: Automatically Detecting Implicit Control Flow Transitions through the Android Framework." NDSS. 2015. pp. 1-15 (Year: 2015).*

Kieyzun, Adam, et al. "Automatic creation of SQL injection and cross-site scripting attacks." 2009 IEEE 31st international conference on software engineering. IEEE, 2009. pp. 199-209 (Year: 2009).*

(Continued)

*Primary Examiner* — Satish Rampuria
(74) *Attorney, Agent, or Firm* — Ferguson Braswell Fraser Kubasta PC

(57) ABSTRACT

A method may include extracting, from a function included in code, sub-tokens and program analysis features, generating sub-token vectors from the sub-tokens and a program analysis vector from the program analysis features, combining, by a machine learning model, the sub-token vectors to obtain a combined sub-token vector, combining the combined sub-token vector and the program analysis vector to obtain a function vector, and classifying, using the function vector, the function as a function category.

20 Claims, 7 Drawing Sheets

(56) References Cited

OTHER PUBLICATIONS

Egele, Manuel, et al. "A survey on automated dynamic malware-analysis techniques and tools." ACM computing surveys (CSUR) 44.2 (2008): pp. 1-42. (Year: 2008).*
Livshits, V. Benjamin, and Monica S. Lam. "Finding Security Vulnerabilities in Java Applications with Static Analysis." USENIX security symposium. vol. 14. 2005. pp. 271-286 (Year: 2005).*
Lam, Monica S., et al. "Context-sensitive program analysis as database queries." Proceedings of the twenty-fourth ACM SIGMOD-SIGACT-SIGART symposium on Principles of database systems. 2005. pp. 1-12 (Year: 2005).*
Livshits, B. et al., "Merlin: Specification Inference for Explicit Information Flow Problems"; ACM SIGPLAN Notices, May 2009 (12 pages).
Rasthofer, S. et al., "A Machine-Learning Approach for Classifying and Categorizing Android Sources and Sinks", NDDS Symposium, Feb. 2014 (15 pages).
Sas, D. et al., "Automatic Detection of Sources and Sinks in Arbitrary Java Libraries", 18th IEEE International Working Conference on Source Code Analysis and Manipulation, Sep. 2018 (10 pages).

\* cited by examiner

Example Program Analysis Features — 200

| Feature type | Features | Explanation |
|---|---|---|
| Class 202 | ClassModifier | Identify the class modifier type: public, private, protected, etc... |
| | IsInnerClass | Check if the class is an inner class |
| | IsAnonymousClass | Check if the class is an anonymous class |
| | ClassNameHas<keyword> | Check if the class name has keywords like sanitize, validate, encode, .io, etc... |
| Method 204 | IsConstructor | Check if the method is a constructor |
| | MethodModifier | Identify the method modifier type: public, private, abstract, static, etc... |
| | IsVoidMethod | Check if the method is a void method |
| | MethodNameHas<keyword> | Check if the method name has keywords like sanitize, validate, escape, etc... |
| | MethodNameHas<prefix> | Check if the method name starts with get, open, validate, etc... |
| Return type 206 | HasReturnType | Check if the method has a return type |
| | ReturnsConstant | Check if the method returns a constant |
| | ReturnTypeHas<keyword> | Check if the method name has keywords like sql, resultset, byte [], etc... |
| Invocation 208 | HasMethodInvocation | Check if the method has any method invocations |
| | InvokedMethodHas<keyword> | Check if the invoked method name has keywords like encode, sanitize, sql, etc... |
| | InvokedClassHas<keyword> | Check if the invoked class name has keywords like sql, web, .io., etc... |
| Parameters 210 | HasParameters | Check if the method takes any parameters |
| | ParameterTypeHas<keyword> | Check if the parameter type has keywords like .io, sql, byte[], db, etc... |
| | ParameterTypeMatchesReturntype | Check if any of the parameter types match the return type |
| Data-flow 212 | ParameterFlowsToReturn | Check if there is a data-flow from the parameter to the return value |
| | ParameterFlowsToConditionalBranch | Check if there is a data-flow from the parameter to a conditional branch |
| | ParameterFlowsToMethodInvocation | Check if there is a data-flow from the parameter to a method invocation |
| | ParamFlowsToMethodHaving<keyword> | Check if there is a data-flow from the parameter to a method having send, write |

FIG. 2A

```
                                                    Program
                                                    Analysis
                                  Function          Feature C
                                    400               402C
                                     ↓
public void doGet (ServletRequest req, ServletResponse res) {
  String id = req.getParameter("id") ;
  Statement stmt = getConnection().createStatement() ;
  id = ESAPI.encoder().encodeForSQL(new OracleCodec() , id) ;
  String sql = "select * from PROD where id = '" + id + "'" ;
  ResultSet rs = stmt.executeQuery(sql) ;
  ...
}
```

Program    Program      Function
Analysis   Analysis     Identifier (ID)
Feature A  Feature B    404
402A       402B 402D
Program
Analysis
Feature D

FIG. 4A

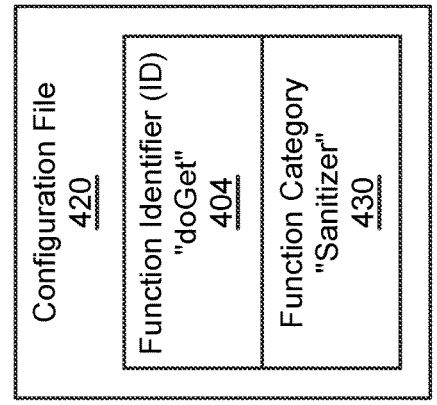

FIG. 4B

AUTOMATED FUNCTION CATEGORY DETECTION

BACKGROUND

Static code analysis tools often allow users to specify categories of functions relevant to performing the analysis. For example, a taint analysis tool may allow users to specify, in a configuration file for an application, locations of sources (where external, and thus potentially tainted data enters an application), sanitizers (functions that "un-taint" potentially tainted data), and/or sinks (functions that perform security-sensitive operations). A capability for automatically and efficiently generating such configuration files is desirable.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including extracting, from a function included in code, sub-tokens and program analysis features, generating sub-token vectors from the sub-tokens and a program analysis vector from the program analysis features, combining, by a machine learning model, the sub-token vectors to obtain a combined sub-token vector, combining the combined sub-token vector and the program analysis vector to obtain a function vector, and classifying, using the function vector, the function as a function category.

In general, in one aspect, one or more embodiments relate to a system including a computer processor, a repository configured to store code including a function, and a function category detector executing on the computer processor and configured to extract, from the function, sub-tokens and program analysis features, generate sub-token vectors from the sub-tokens and a program analysis vector from the program analysis features, combine, by a machine learning model, the sub-token vectors to obtain a combined sub-token vector, combine the combined sub-token vector and the program analysis vector to obtain a function vector, and classify, using the function vector, the function as a function category.

In general, in one aspect, one or more embodiments relate to a method including sending code to a function category detector configured to perform: extracting, from a function included in the code, sub-tokens and program analysis features, generating sub-token vectors from the sub-tokens and a program analysis vector from the program analysis features, combining, by a machine learning model, the sub-token vectors to obtain a combined sub-token vector, combining the combined sub-token vector and the program analysis vector to obtain a function vector, and classifying, using the function vector, the function as a function category. The method further includes receiving, from the function category detector, the function category.

Other aspects of the invention will be apparent from the following description and the appended claims.

BRIEF DESCRIPTION OF DRAWINGS

FIG. 2A and FIG. 2B show examples in accordance with one or more embodiments of the invention.

FIG. 4A and FIG. 4B show examples in accordance with one or more embodiments of the invention.

DETAILED DESCRIPTION

Figure 1:
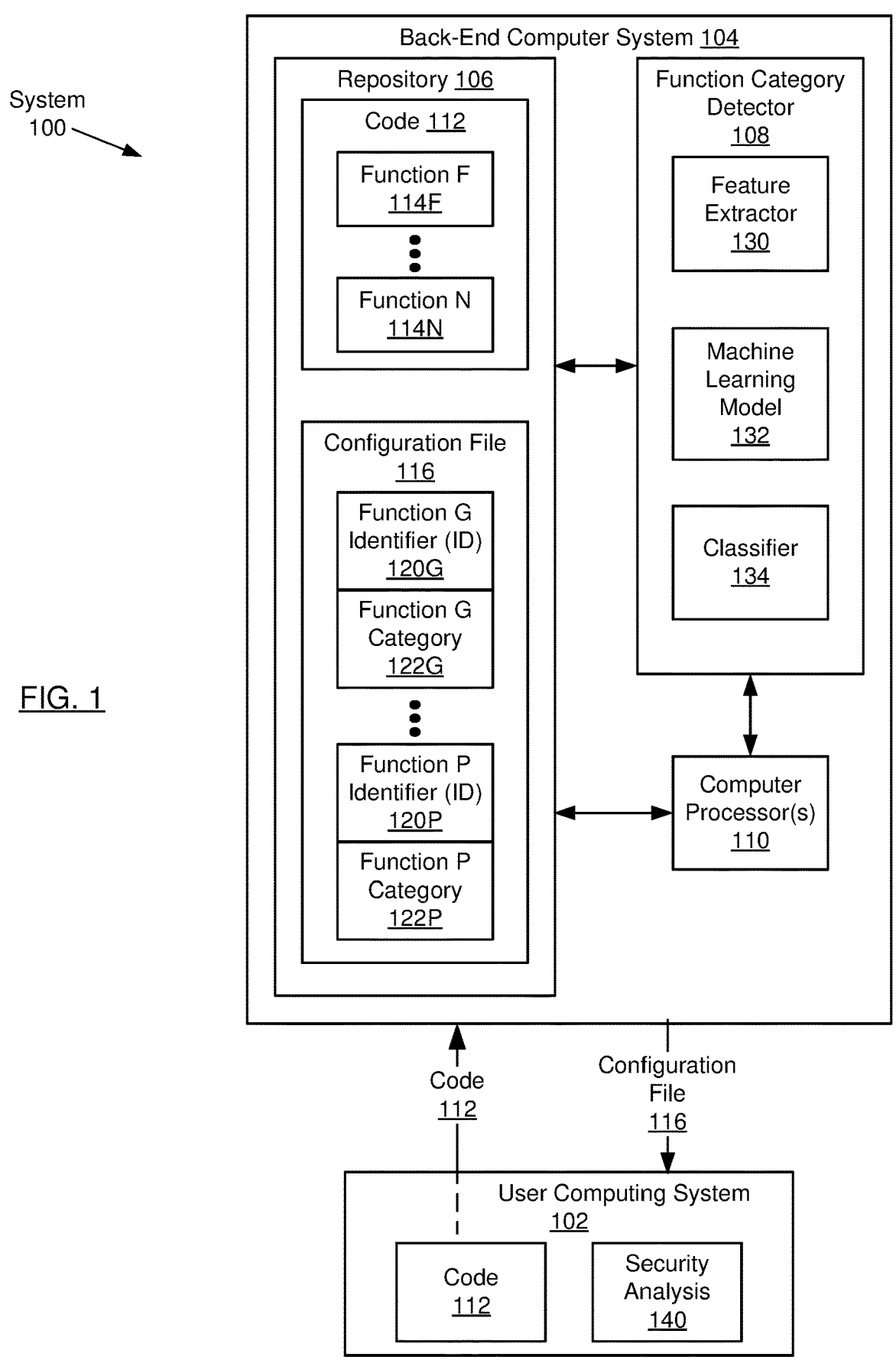
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to classifying a function included in code. Sub-tokens and program analysis features are extracted from a function. Sub-tokens are substrings of tokens extracted from the function. Program analysis features are various characteristics of the function. For example, program analysis features may correspond to: a class associated with the function, the name or type of the function, a return value of the function, a function invoked by the function, parameters of the function, a data-flow within the function, etc. Sub-token vectors are generated from the sub-tokens, and a program analysis vector is generated from the program analysis features. A machine learning model may generate the sub-token vectors. For example, a trained neural network may generate vector embeddings for tokens unseen during training when the tokens are combinations of sub-tokens for which the neural network has learned sub-token vector embeddings. The machine learning model may combine the sub-token vectors into a single combined sub-token vector. The combined sub-token vector and the program analysis vector are combined to obtain a function vector. A classifier is applied to the function vector to assign a function category to the function. For example, the function category may be a security relevant category, such as "sink" or "sanitizer." An identifier of the function and the assigned function category may be added to a configuration file. The configuration file may be used when performing a security analysis of the code.

FIG. 1 shows a system (100) in accordance with one or more embodiments of the invention. As shown in FIG. 1, the system (100) includes a user computing system (102) and a back-end computer system (104). In one or more embodiments, the user computing system (102) and the back-end computer system (104) take the form of the computing system (500) described with respect to FIG. 5A and the accompanying description below or take the form of the client device (526) described with respect to FIG. 5B. The back-end computer system (104) includes a repository (106), a function category detector (108), and computer processor(s) (110).

In one or more embodiments, the repository (106) is any type of storage unit and/or device (e.g., a file system, database, collection of tables, or any other storage mechanism) for storing data. Further, the repository (106) may include multiple different storage units and/or devices. The multiple different storage units and/or devices may or may not be of the same type or located at the same physical site. The repository (106) may be accessed online via a cloud service (e.g., Oracle Cloud, Amazon Web Services (AWS), Egnyte, Azure, etc.).

In one or more embodiments, the repository (106) includes functionality to store code (112) and a configuration file (116). The code (112) is a collection of statements (e.g., computer instructions) written in source code of a human-readable programming language. The code (112) includes functions (114F, 114N). A function (114F) is a portion of the code (112) that generates one or more return values and/or side effects using input parameters. Examples of functions include procedures, methods, commands, etc.

The configuration file (116) includes function identifiers (120G, 120P) and corresponding function categories (122G, 122P). A function identifier (120G) is a value (e.g., a function name) that identifies a function. A function category (122G) is a category of function behavior. For example, the function category (122G) may be a security category relevant to performing a security analysis (140). Continuing this example, the security category may be "sink," "sanitizer," "source," "validator," etc. The security analysis (140) may analyze the code (112) to detect security vulnerabilities. For example, a security vulnerability may correspond to a flow of tainted data from a taint source to a taint sink without processing the data by a sanitizer. A taint source may receive potential attacker-controllable input. A taint sink may perform a security-sensitive operation. For example, the security-sensitive operation may execute the JavaScript eval operator. As another example, the security-sensitive operation may access a security-sensitive resource of a computer system (e.g., the user computing system (102)) that requires an elevated privilege for access. A sanitizer is a statement or function that transforms a potentially tainted value into a safe (e.g., trusted) value that is not associated with a security vulnerability. For example, a sanitizer may modify a value by encoding or replacing potentially dangerous characters with harmless equivalents. Continuing this example, the potentially dangerous characters may be filtered or escaped.

As another example, the function category (122G) may be a category relevant to program comprehension (e.g., by a debugger), such as a cryptographic algorithm or a sorting algorithm.

The user computing system (102) may be a mobile device (e.g., phone, tablet, digital assistant, laptop, etc.) or any other computing device (e.g., desktop, terminal, workstation, etc.) with a computer processor (not shown) and memory (not shown) capable of running computer software. The user computing system (102) includes functionality to send code (112) to the function category detector (108). The user computing system (102) includes functionality to receive a configuration file (116) from the function category detector (108). The user computing system (102) includes functionality to perform a security analysis (140) using the configuration file (116).

Continuing with FIG. 1, the function category detector (108) includes a feature extractor (130), a machine learning model (132), and a classifier (134). The feature extractor (130) includes functionality to extract (e.g., parse), from a function (114F), one or more program analysis features. Program analysis features are various characteristics of a function. As an example, FIG. 2A lists program analysis features (200) grouped into six feature types (202, 204, 206, 208, 210, 212), for a function F. Class features (202) correspond to a class associated with function F. For example, it may be important to know whether the class is an anonymous class, an inner class, whether the class uses modifiers, etc. Method features (204) correspond to a type or name of function F. Return type features (206) correspond to a type of value returned by function F. Invocation features (208) correspond to a function G invoked by function F. Parameter features (210) correspond to one or more parameters of function F. For example, a parameter feature may indicate whether a parameter of function F includes a tag indicating that the parameter is potentially tainted. Continuing this example, the tag may have been associated with the parameter by an interprocedural analysis that detected a flow to the parameter from a potentially tainted output of a function G. Further continuing this example, the tag may include a location (e.g., a source code line number) of a taint source in the code (112). Data-flow features (212) may correspond to an intraprocedural data flow within function F starting from a parameter of function F. For example, the presence of an intraprocedural data flow from a parameter of function F to a return value of function F may be a hint that function F corresponds to the function category "sanitizer". Alternatively or additionally, data-flow features (212) may correspond to an interprocedural data flow between a parameter of function F and one or more other functions.

In the example shown in FIG. 2A, each program analysis feature has a Boolean value. Other examples of program analysis features may have textual values, numeric values, or other types of values.

The machine learning model (132) includes functionality to extract tokens from a function (114F). Each token is a string of characters. Each character may be a letter, a number, a symbol, etc. For example, the statement "Statement stmt=getConnection( ).createStatement( );" includes five tokens: {"Statement", "stmt", "=", "getConnection", "createStatement"}.

The machine learning model (132) includes functionality to extract sub-tokens from a token. Each sub-token is a substring of the token. For example, the token "getconnection" may be split into eleven sub-tokens of size three: {"get", "etc", "tco", "con", "onn", "nne", "nec", "ect", "cti", "tio", "ion"}. The machine learning model (132) includes functionality to generate sub-token vectors from the sub-tokens. The machine learning model (132) includes functionality to combine the sub-token vectors into a combined sub-token vector.

Figure 2B:
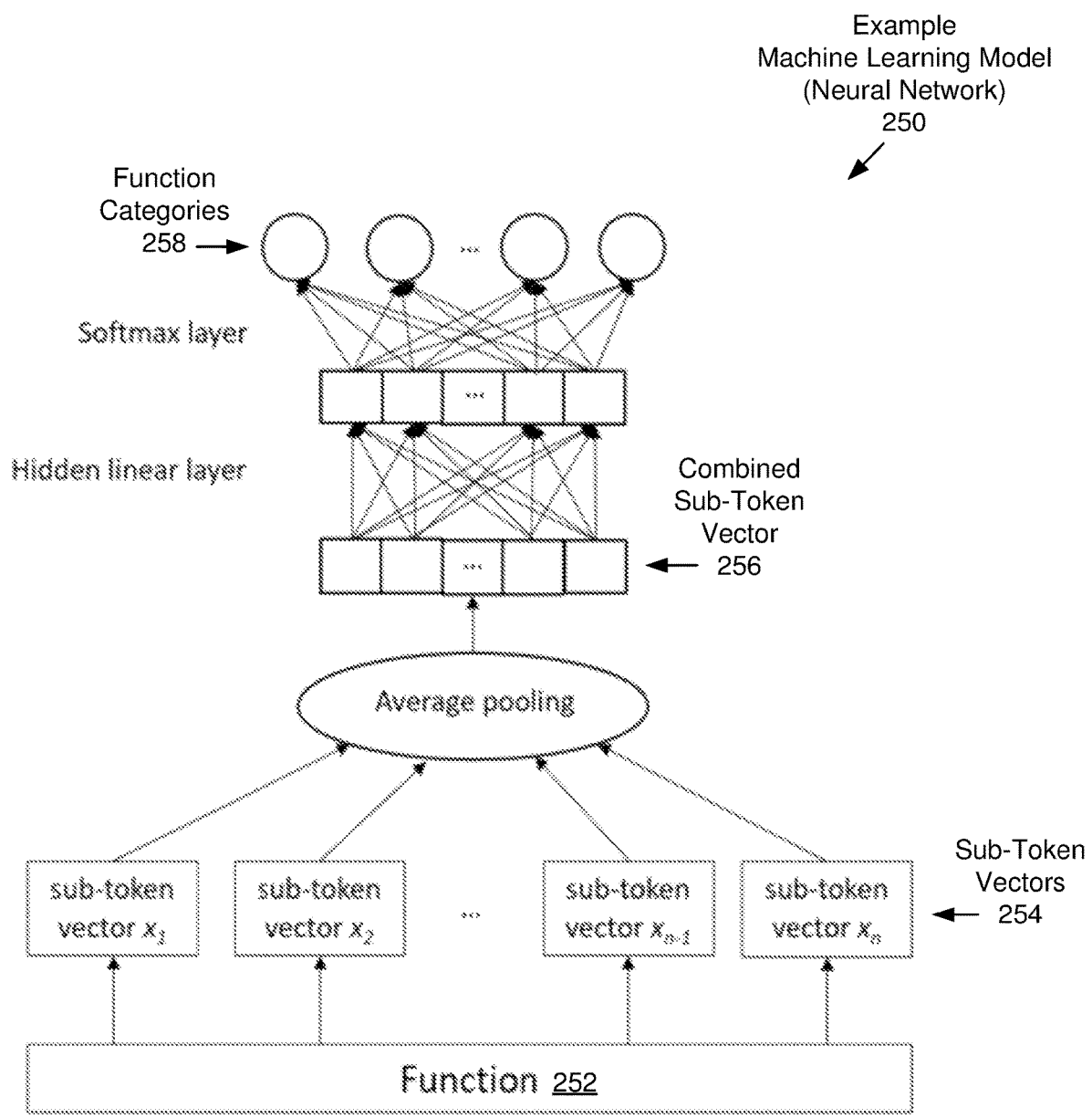

The machine learning model (132) may be implemented as a neural network. FIG. 2B shows an example of a neural network (250) that implements the machine learning model (132). The neural network (250) includes functionality to generate sub-token vectors (254) from a function (252). The neural network (250) includes functionality to combine the sub-token vectors (254) into a combined sub-token vector (256). The neural network (250) includes one or more hidden linear layers with functionality to learn (e.g., via back propagation) vector embeddings for sub-tokens by performing the classification task of predicting function categories (258) for a ground-truth training dataset. The neural network (250) may generate vector embeddings for tokens unseen during training using the learned sub-token vector embeddings. For example, the neural network (250) may generate vector embeddings for tokens unseen during training that are combinations of sub-tokens for which the neural network (250) has learned sub-token vector embeddings.

The classifier (134) includes functionality to classify a function vector as a function category (e.g., function category (122G)). The classifier (134) may learn the classifications of function vectors as function categories based on a supervised ground-truth training data set. In one or more embodiments, each record in the training data set includes a function vector labeled with a function category.

The classifier (134) may be implemented as a support vector machine (SVM) classifier. Alternatively, the classifier (134) may be implemented as various types of deep learning models based on neural networks (e.g., based on convolutional neural networks (CNNs)), random forests, stochastic gradient descent (SGD), a lasso classifier, gradient boosting (e.g., XGBoost), bagging, adaptive boosting (AdaBoost), ridges, elastic nets, Nu Support Vector Regression (NuSVR), etc.). Deep learning, also known as deep structured learning or hierarchical learning, is part of a broader family of machine learning methods based on learning data representations, as opposed to task-specific algorithms.

In one or more embodiments, the computer processor(s) (110) takes the form of the computer processor(s) (502) described with respect to FIG. 5A and the accompanying description below. In one or more embodiments, the computer processor (110) includes functionality to execute the function category detector (108).

While FIG. 1 shows a configuration of components, other configurations may be used without departing from the scope of the invention. For example, various components may be combined to create a single component. As another example, the functionality performed by a single component may be performed by two or more components.

Figure 3A:
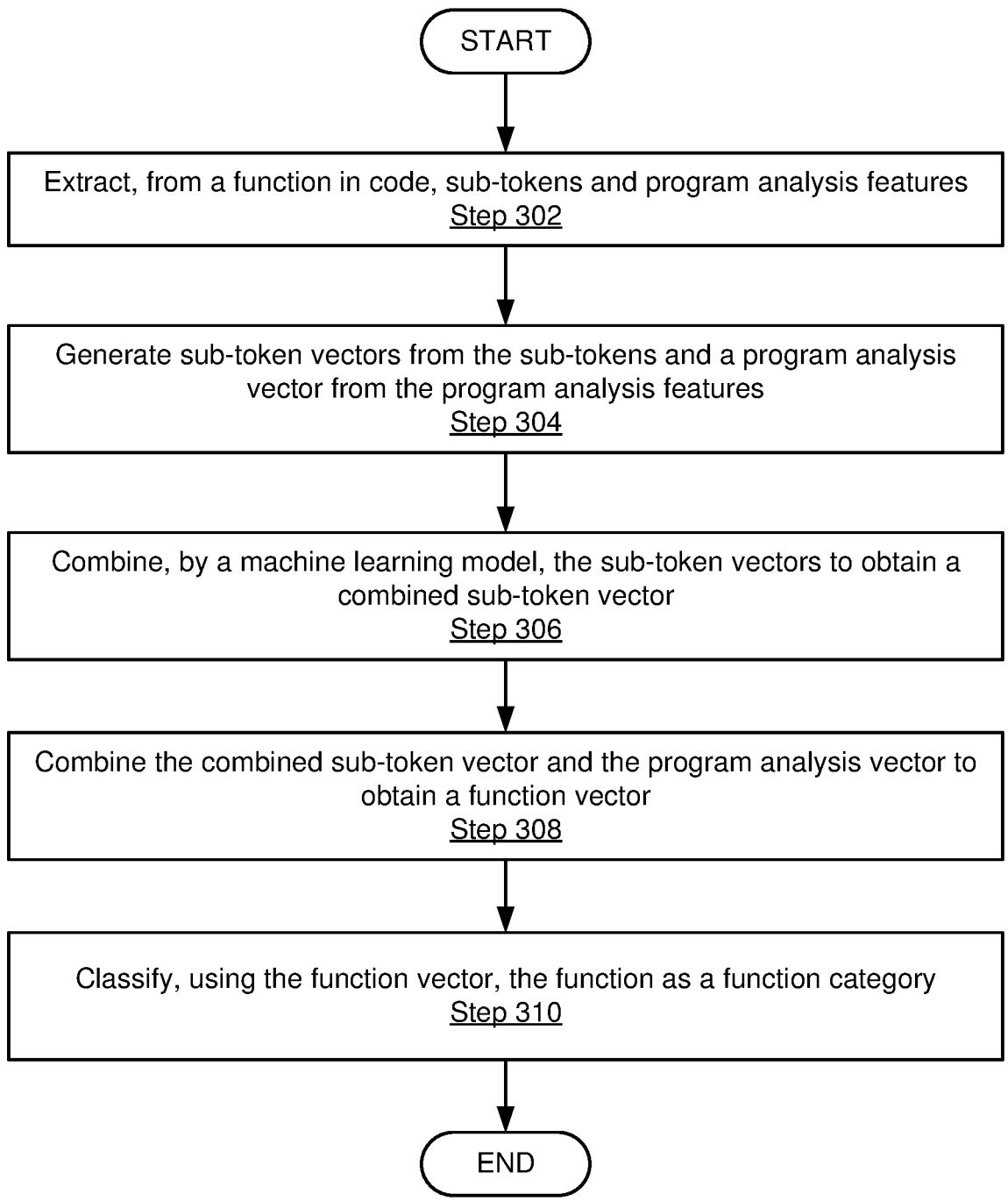
FIG. 3A and FIG. 3B show flowcharts in accordance with one or more embodiments of the invention.

FIG. 3A shows a flowchart in accordance with one or more embodiments of the invention. The flowchart depicts a process for classifying a function. One or more of the steps in FIG. 3A may be performed by the components (e.g., the function category detector (108) of the back-end computer system (104) and/or the user computing system (102), discussed above in reference to FIG. 1). In one or more embodiments of the invention, one or more of the steps shown in FIG. 3A may be omitted, repeated, and/or performed in parallel, or in a different order than the order shown in FIG. 3A. Accordingly, the scope of the invention should not be considered limited to the specific arrangement of steps shown in FIG. 3A.

Initially, in Step 302, sub-tokens and program analysis features are extracted from a function included in code. The function category detector may obtain the code from a repository. The feature extractor may perform a lightweight analysis of the function to extract the program analysis features. For example, the feature extractor may extract program analysis features by parsing the function to detect various features (e.g., the program analysis features listed in FIG. 2A). The feature extractor may perform an intraprocedural data-flow analysis of the function in order to extract data-flow program analysis features.

The machine learning model may extract the sub-tokens from the function. For example, the machine learning model may extract all sub-tokens of length three (e.g., trigrams) from the function.

In Step 304, sub-token vectors are generated from the sub-tokens, and a program analysis vector is generated from the program analysis features. For example, the feature extractor may generate a program analysis vector that includes Boolean values corresponding to one or more of the program analysis features listed in FIG. 2A. The machine learning model may be implemented as a neural network that generates vector embeddings for tokens unseen during training using learned sub-token vector embeddings. For example, the neural network may generate vector embeddings for tokens unseen during training that are combinations of sub-tokens for which the neural network has learned sub-token vector embeddings.

The machine learning model may generate the sub-token vectors by randomly initializing the sub-token vectors. For example, after randomly initializing the sub-token vectors, the machine learning model may learn weighting coefficients via back propagation. Alternatively, the sub-token vectors may be initialized using a pretrained model in order to avoid the iterative process of back propagation.

In Step 306, the sub-token vectors are combined by a machine learning model to obtain a combined sub-token vector. The machine learning model may combine the sub-token vectors using average pooling. Alternatively, the machine learning model may combine the sub-token vectors using maximum pooling, minimum pooling, concatenation, or some other method for combining the sub-token vectors.

In Step 308, the combined sub-token vector and the program analysis vector are combined to obtain a function vector. The function category detector may combine (e.g., concatenate) the combined sub-token vector and the program analysis vector by multiplying the combined sub-token vector and the program analysis vector by weights. For example, the weights may be hyperparameters that are set by a user (e.g., a software developer). Continuing this example, the program analysis vector may be assigned a larger weight because the program analysis features may capture the semantics of the function more accurately than the sub-tokens.

In Step 310, the function is classified, using the function vector, as a function category. The classifier may generate, for the function vector, a score for each of several function categories. The function category detector may assign, to the function, the function category corresponding to the highest score. For example, the function category detector may assign the function category corresponding to the highest score that exceeds a threshold score. The function category detector may generate, for the code that includes the function, a configuration file including an identifier of the function and the corresponding assigned function category.

The process of FIG. 3A may be executed for multiple functions included in the code. The function category detector may add, for each function that is assigned a function category, an entry to the configuration file including the identifier of the function and the corresponding assigned function category. Each function category may be a security relevant category (e.g., "taint source", "sink", "sanitizer," etc.). For example, the configuration file may be used when performing a security analysis of the code.

The configuration file may be presented to a user for review. For example, the configuration file may be presented to the user via a graphical user interface (GUI) of the user computing system, where the user may approve or reject each entry in the configuration file. Continuing this example, the user may approve or reject an entry in the configuration file after examining the function corresponding to the entry and determining whether the function category assigned to the function is correct or incorrect.

Figure 3B:
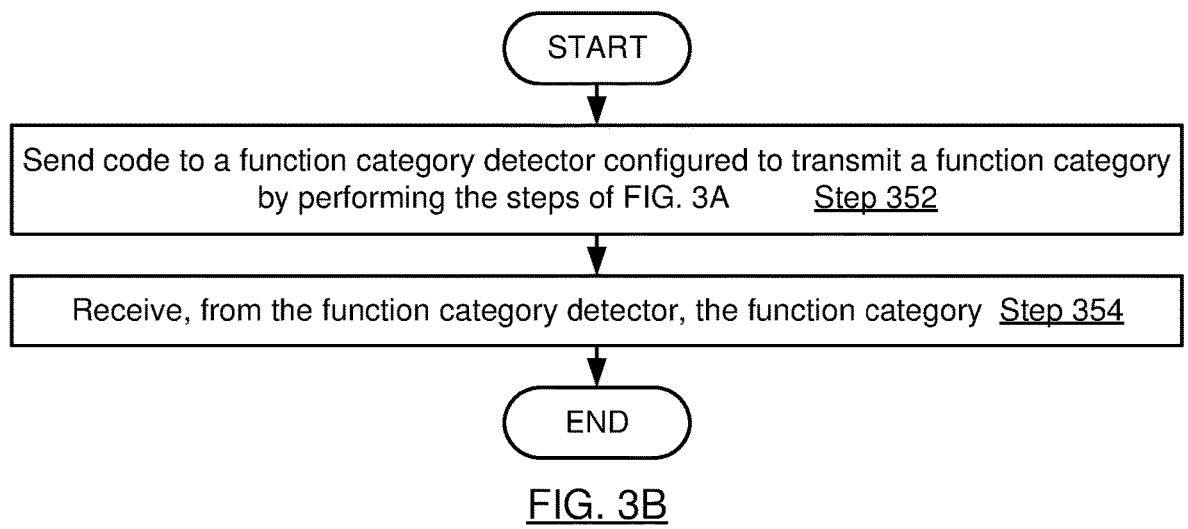

FIG. 3B shows a flowchart in accordance with one or more embodiments of the invention. The flowchart depicts a process for classifying a function. One or more of the steps in FIG. 3B may be performed by the components (e.g., the function category detector (108) of the back-end computer system (104) and/or the user computing system (102), discussed above in reference to FIG. 1). In one or more embodiments of the invention, one or more of the steps shown in FIG. 3B may be omitted, repeated, and/or performed in parallel, or in a different order than the order shown in FIG. 3B. Accordingly, the scope of the invention should not be considered limited to the specific arrangement of steps shown in FIG. 3B.

Initially, in Step 352, code is sent to a function category detector configured to transmit a function category by performing the steps of FIG. 3A. The code may be sent to the function category detector over a network (e.g., network (520) of FIG. 5B). The function category detector may be deployed as a cloud service. For example, deploying the function category detector as a cloud service may enable accumulation of a large volume of functions which may be used in a training dataset for the machine learning model. Continuing this example, the large training dataset may be leveraged to "deepen" a neural network implementation of the machine learning model by adding layers (e.g., additional hidden layers) to better accommodate the large training dataset.

In Step 354, the function category is received from the function category detector. The function category may be received from the function category detector via the network.

FIG. 4A and FIG. 4B show an implementation example in accordance with one or more embodiments. The implementation example is for explanatory purposes only and not intended to limit the scope of the invention. One skilled in the art will appreciate that implementation of embodiments of the invention may take various forms and still be within the scope of the invention.

FIG. 4A shows a function (400) ((114F, 114N) in FIG. 1) from which the feature extractor extracts program analysis features (402A, 402B, 402C, 402D). The function (400) has a function identifier (e.g., a function name) "doGet" (404) ((120G, 120P) in FIG. 1). The program analysis features (402A, 402B, 402C, 402D) correspond to several of the example program analysis features (200) listed in FIG. 2A. Program analysis feature A (402A) indicates a type of class modifier, in this case, the class modifier "public." Program analysis feature B (402B) indicates a type of function (e.g., method), in this case, the type of function that returns "void." Program analysis feature C (402C) indicates that the function (400) has parameters. Program analysis feature D (402D) indicates the function (400) invokes the function "encodeForSQL" whose name includes a specific keyword, in this case, the keyword "encode." Invoking a function whose name includes the keyword "encode" may indicate that the function (400) likely includes functionality corresponding to the function category "sanitizer." The feature extractor further performs an intraprocedural data-flow analysis on the function (400) to extract a data-flow feature (not shown) indicating that the value of a parameter (i.e., the "req" parameter) flows to a function invocation (i.e., the function (400) of the "executeQuery" function) within the function (400).

The machine learning model extracts sub-tokens from the function (400). For example, as described earlier, the machine learning model may extract the following sub-tokens of size three from the token "getconnection": { "get", "etc", "tco", "con", "onn", "nne", "nec", "ect", "cti", "tio", "ion"}. The machine learning model generates sub-token vectors from the sub-tokens, and then combines the sub-token vectors into a combined sub-token vector.

The function category detector generates a function vector by combining the combined sub-token vector with a program analysis vector generated from the program analysis features. The function category detector then classifies the function (400) as a function category by applying the classifier to the function vector. The classifier generates a score of 0.5 for the function category "sink" and a score of 0.8 for the function category "sanitizer". In this example, the function category detector classifies the function (400) as the function category "sanitizer" because the score of 0.8 for the function category "sanitizer" is the highest score and because the score of 0.8 exceeds a minimum threshold score of 0.75.

As shown in FIG. 4B, the function category detector generates a configuration file (420) ((116) in FIG. 1) for the code that includes the function (400). The configuration file (420) includes an entry containing the function identifier "doGet" (404) of the function (400) and the corresponding function category "sanitizer" (430) ((122G, 122P) in FIG. 1).

Embodiments disclosed herein may be implemented on a computing system specifically designed to achieve an improved technological result. When implemented in a computing system, the features and elements of this disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5A:
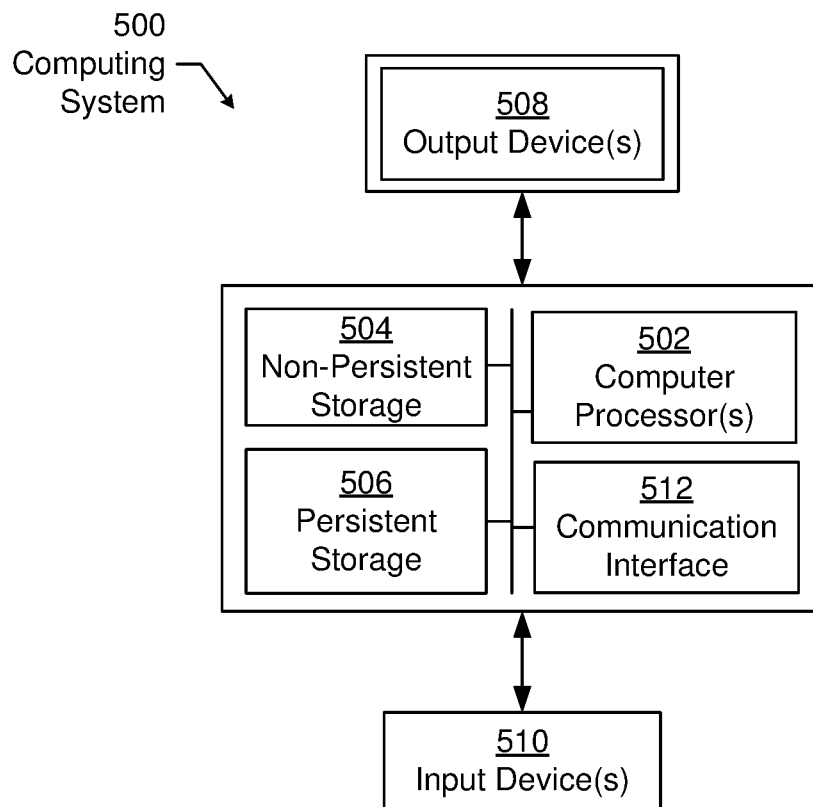
FIG. 5A and FIG. 5B show computing systems in accordance with one or more embodiments of the invention.
Figure 5B:
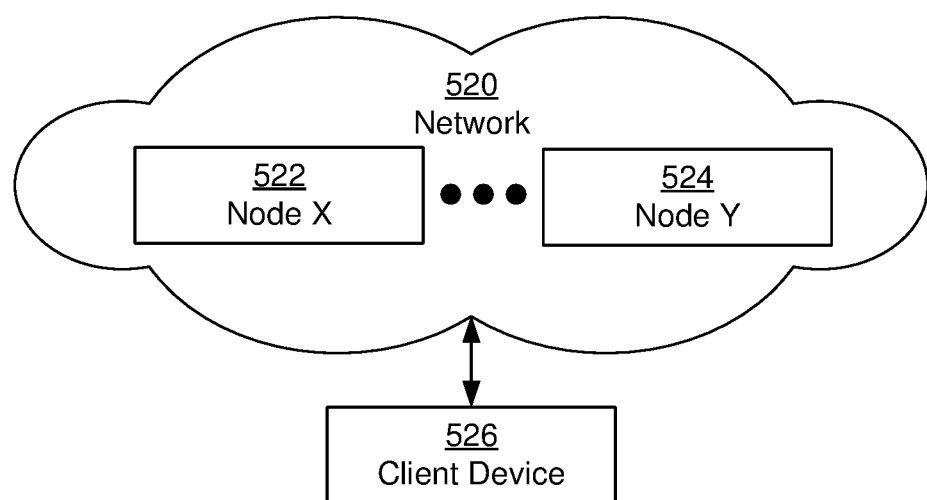

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
extracting, from a function in software code, a plurality of sub-tokens and program analysis features;
processing, by a machine learning model, the plurality of sub-tokens to generate a plurality of sub-token vectors, the plurality of sub-token vectors being vector embeddings of the plurality of sub-tokens;
generating, by the machine learning model, a program analysis vector from the program analysis features;
combining, by a pooling layer of the machine learning model, the plurality of sub-token vectors to generate a combined sub-token vector;
combining the combined sub-token vector and the program analysis vector to obtain a function vector; and
classifying, using the function vector, the function as a function category.

2. The method of claim 1, further comprising:
generating, for the software code, a configuration file comprising an identifier of the function and the function category.

3. The method of claim 2, wherein the function category is a security relevant category, the method further comprising:
performing, using the configuration file, a security analysis of the software code.

4. The method of claim 1, wherein the machine learning model comprises functionality to:
generate a training plurality of sub-token vectors corresponding to a plurality of sub-tokens of a training dataset, and
learn a token vector corresponding to a token using the training plurality of sub-token vectors, wherein the token comprises the plurality of sub-tokens of the training dataset.

5. The method of claim 4, wherein the token is not comprised by the training dataset.

6. The method of claim 1, wherein one of the program analysis features is based on analyzing a data flow within the function starting from a parameter of the function.

7. The method of claim 1,
wherein generating the sub-token vectors comprises randomly initializing the sub-token vectors, and
wherein the sub-token vectors are combined using average pooling.

8. A system comprising:
a computer processor;
a repository configured to store software code comprising a function; and
a function category detector executing on the computer processor and configured to:
extract, from the function, a plurality of sub-tokens and program analysis features,
process, by a machine learning model, the plurality of sub-tokens to generate a plurality of sub-token vectors, the plurality of sub-token vectors being vector embeddings of the plurality of sub-tokens,
generate, by the machine learning model, a program analysis vector from the program analysis features,
combine, by a pooling layer of the machine learning model, the plurality of sub-token vectors to generate a combined sub-token vector,
combine the combined sub-token vector and the program analysis vector to obtain a function vector, and
classify, using the function vector, the function as a function category.

9. The system of claim 8, wherein the function category detector is further configured to:
generate, for the software code, a configuration file comprising an identifier of the function and the function category.

10. The system of claim 9, wherein the function category is a security relevant category, and wherein the function category detector is further configured to:
perform, using the configuration file, a security analysis of the software code.

11. The system of claim 8, wherein the machine learning model is configured to:
generate a training plurality of sub-token vectors corresponding to a plurality of sub-tokens of a training dataset, and
learn a token vector corresponding to a token using the training plurality of sub-token vectors, wherein the token comprises the plurality of sub-tokens of the training dataset.

12. The system of claim 11, wherein the token is not comprised by the training dataset.

13. The system of claim 8, wherein one of the program analysis features is based on analyzing a data flow within the function starting from a parameter of the function.

14. The system of claim 8, wherein the function category detector is further configured to:
generate the plurality of sub-token vectors by randomly initializing the sub-token vectors, and
combine the plurality of sub-token vectors using average pooling.

15. A method comprising:
sending software code to a function category detector configured to perform:
extracting, from a function in the software code, a plurality of sub-tokens and program analysis features, processing, by a machine learning model, the plurality of sub-tokens to generate a plurality of sub-token vectors, the plurality of sub-token vectors being vector embeddings of the plurality of sub-tokens, generating, by the machine learning model, a program analysis vector from the program analysis features, combining, by a pooling layer of the machine learning model, the plurality of sub-token vectors to generate a combined sub-token vector, combining the combined sub-token vector and the program analysis vector to obtain a function vector, and classifying, using the function vector, the function as a function category; and receiving, from the function category detector, the function category.

16. The method of claim 15, wherein the function category detector is further configured to perform:

generating, for the software code, a configuration file comprising an identifier of the function and the function category.

17. The method of claim 16, wherein the function category is a security relevant category, and wherein the function category detector is further configured to perform:

performing, using the configuration file, a security analysis of the software code.

18. The method of claim 15, wherein the machine learning model comprises functionality to:

generate a training plurality of sub-token vectors corresponding to a plurality of sub-tokens of a training dataset, and learn a token vector corresponding to a token using the training plurality of sub-token vectors, wherein the token comprises the plurality of sub-tokens of the training dataset.

19. The method of claim 18, wherein the token is not comprised by the training dataset.

20. The method of claim 15, wherein one of the program analysis features is based on analyzing a data flow within the function starting from a parameter of the function.

* * * * *

UNITED STATES PATENT AND TRADEMARK OFFICE
CERTIFICATE OF CORRECTION

| | |
|---|---|
| PATENT NO. | : 11,822,459 B2 |
| APPLICATION NO. | : 17/330103 |
| DATED | : November 21, 2023 |
| INVENTOR(S) | : Chandramohan et al. |

It is certified that error appears in the above-identified patent and that said Letters Patent is hereby corrected as shown below:

On the Title Page

Column 2, item [56], Line 2, delete "signaturegeneration" and insert -- signature generation --, therefor.

Signed and Sealed this
Eleventh Day of June, 2024

Katherine Kelly Vidal
*Director of the United States Patent and Trademark Office*